United States Patent [19]

Cox et al.

[11] 4,342,531
[45] Aug. 3, 1982

[54] METHOD AND APPARATUS FOR HANDLING BRICKS

[75] Inventors: Joseph A. Cox, Fletcher; Daniel K. Jones, Asheville, both of N.C.

[73] Assignee: EA Industries, Incorporated, Asheville, N.C.

[21] Appl. No.: 125,906

[22] Filed: Feb. 29, 1980

[51] Int. Cl.³ .............................................. B65G 57/22
[52] U.S. Cl. ...................................... 414/46; 198/374; 414/56; 414/82; 414/759; 414/771; 414/786
[58] Field of Search ....................... 414/32, 33, 34, 38, 414/39, 46, 52, 55, 56, 82, 89, 759, 771, 774, 786; 198/419, 422, 434, 374; 53/540, 541

[56] References Cited

U.S. PATENT DOCUMENTS

| | | | |
|---|---|---|---|
| 2,917,991 | 12/1959 | Segur | 198/422 X |
| 2,981,420 | 4/1961 | Johanson | 414/56 X |
| 3,039,593 | 6/1962 | Edmonds et al. | 198/419 |
| 3,289,811 | 12/1966 | Kelley | 198/422 |
| 3,352,435 | 11/1967 | Reinecke | 198/419 X |
| 3,452,884 | 7/1969 | Tanqueray | 414/82 X |
| 3,480,161 | 11/1969 | Bason | 414/56 |
| 3,490,612 | 1/1970 | Webers et al. | 414/55 |
| 3,589,495 | 6/1971 | Pearne et al. | 198/374 |
| 4,173,910 | 11/1979 | Lineberry et al. | 83/29 |
| 4,173,911 | 11/1979 | Lineberry et al. | 83/29 |

Primary Examiner—Leslie J. Paperner
Attorney, Agent, or Firm—William E. Mouzavires

[57] ABSTRACT

Method and apparatus for stacking or stacking as well as facing, bricks. In stacking, the bricks are conveyed to adjacent horizontal fold plates and then one of the plates is moved under the other plate to place the bricks one above the other. The underlying plate with the bricks thereon is moved horizontally away from the upper plate while the bricks on the upper plate are also moved in the same direction so that they are stacked on the bricks on the lower plate. The lower plate is then elevated with the stack of bricks thereon after which the bricks are conveyed off the plate by newly arriving incoming bricks. When it is desired to stack the bricks with their faces contacting each other, after the bricks arrive on the plates (hereinafter termed the first and second plates), the plates are separated in a horizontal plane to expose a third underlying fold plate. The first and second plates are then folded or pivoted upwardly 90° to bottom the bricks on the third plate and to place the faces of the bricks in opposing interrelationship. Then, the second and third plates are pivoted together as a unit 90° to restore the bricks in horizontal planes stacked one above the other with their faces contacting each other. During the latter step the first plate is unfolded back to its horizontal position. Then the third plate is unfolded relative to the second plate back to its original horizontal plane below the first two plates and then the gap between the first and second plates is closed to permit the stacked and faced bricks to be moved off the plates by bricks newly arriving on the first plate.

30 Claims, 22 Drawing Figures

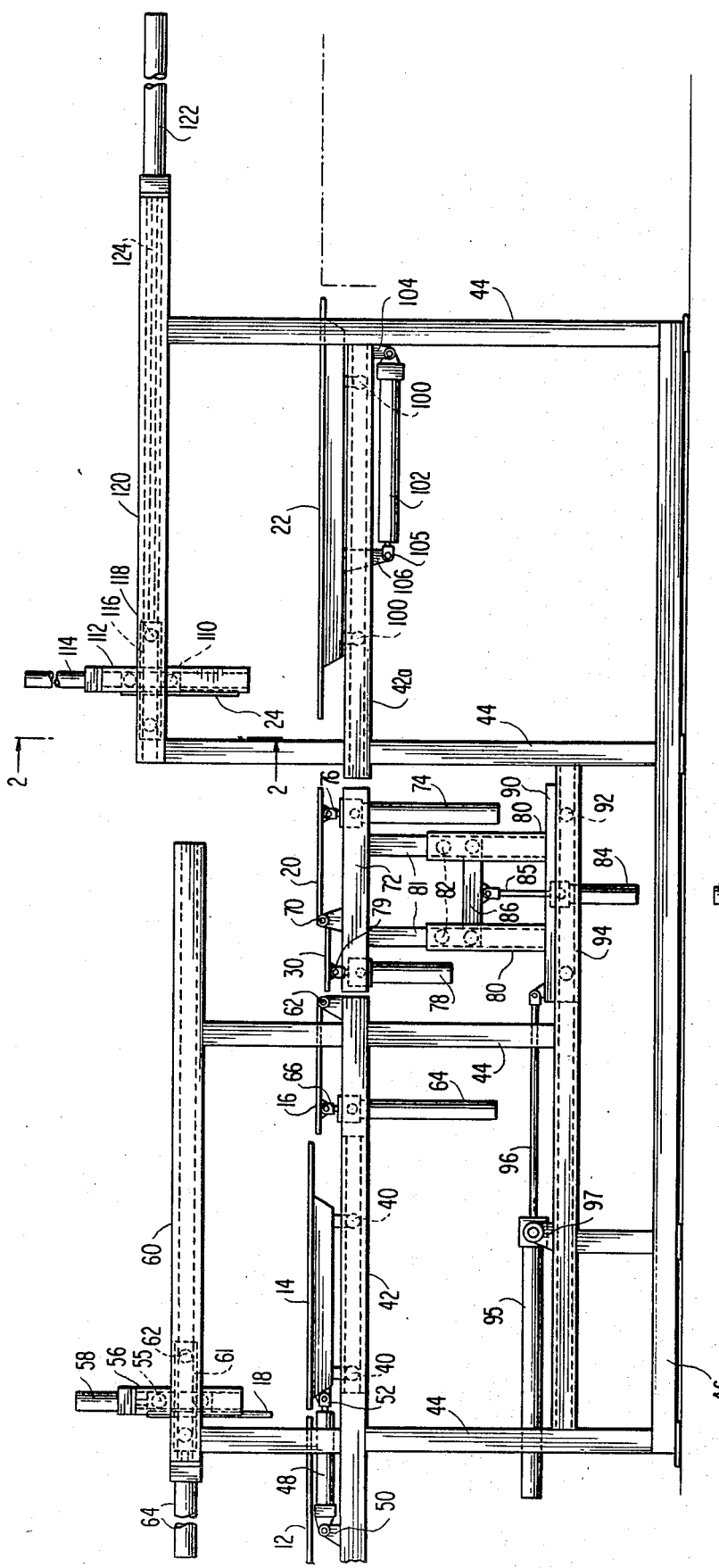
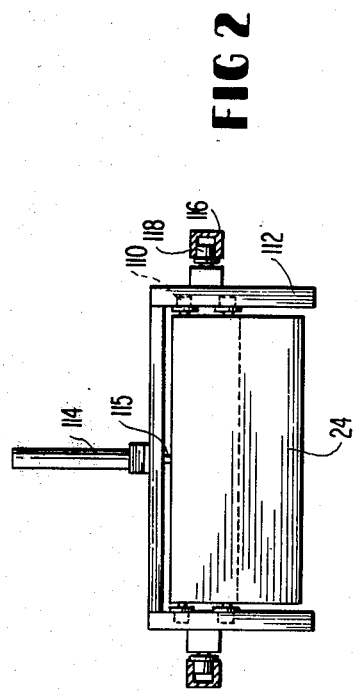
FIG 1
FIG 2

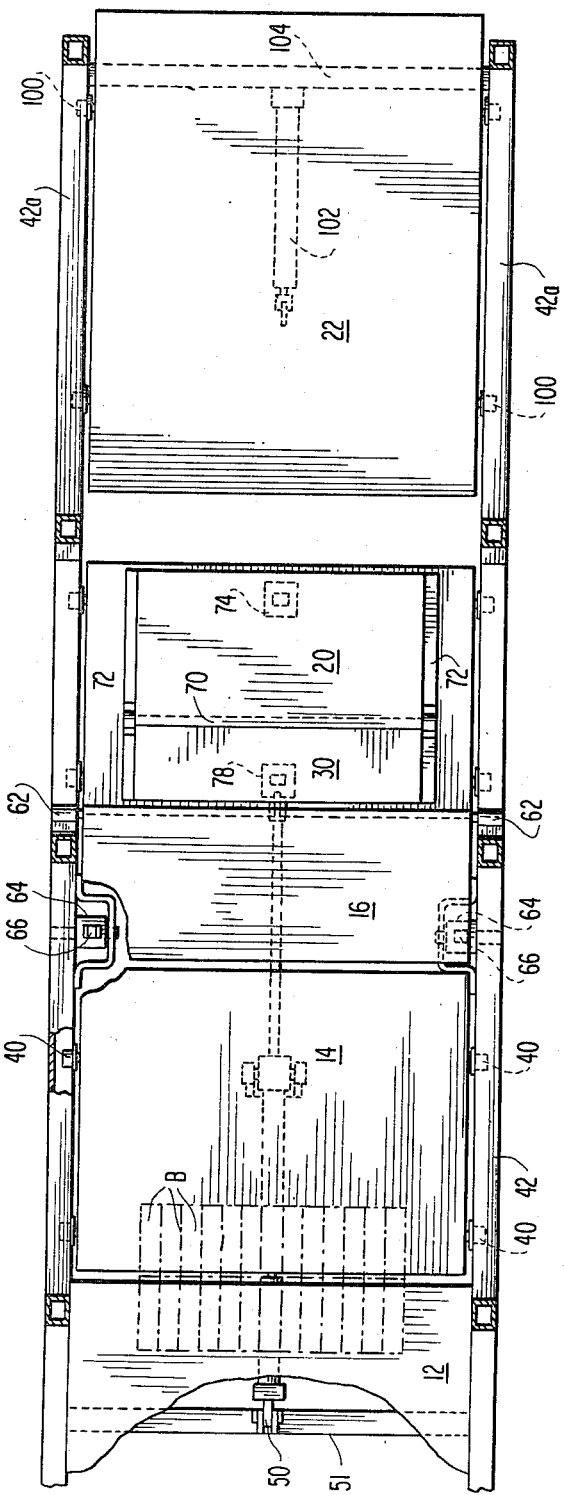
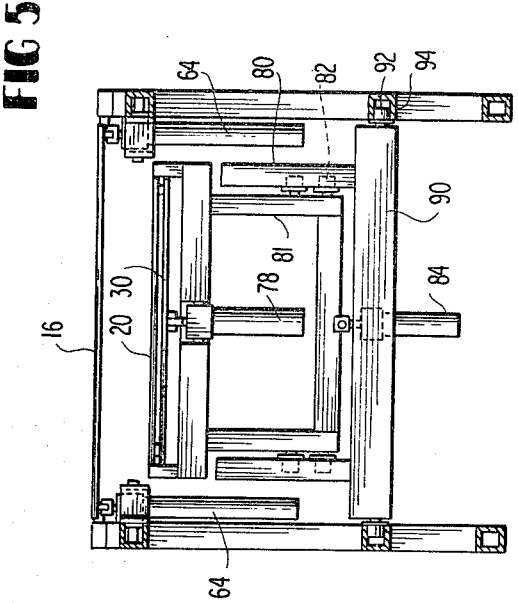
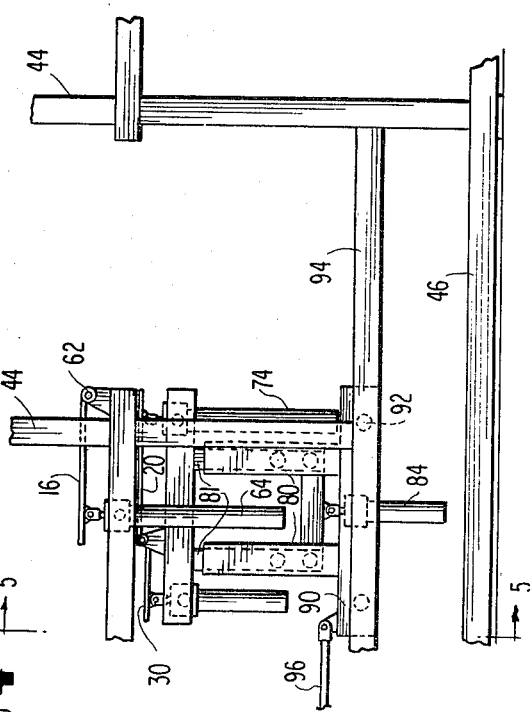

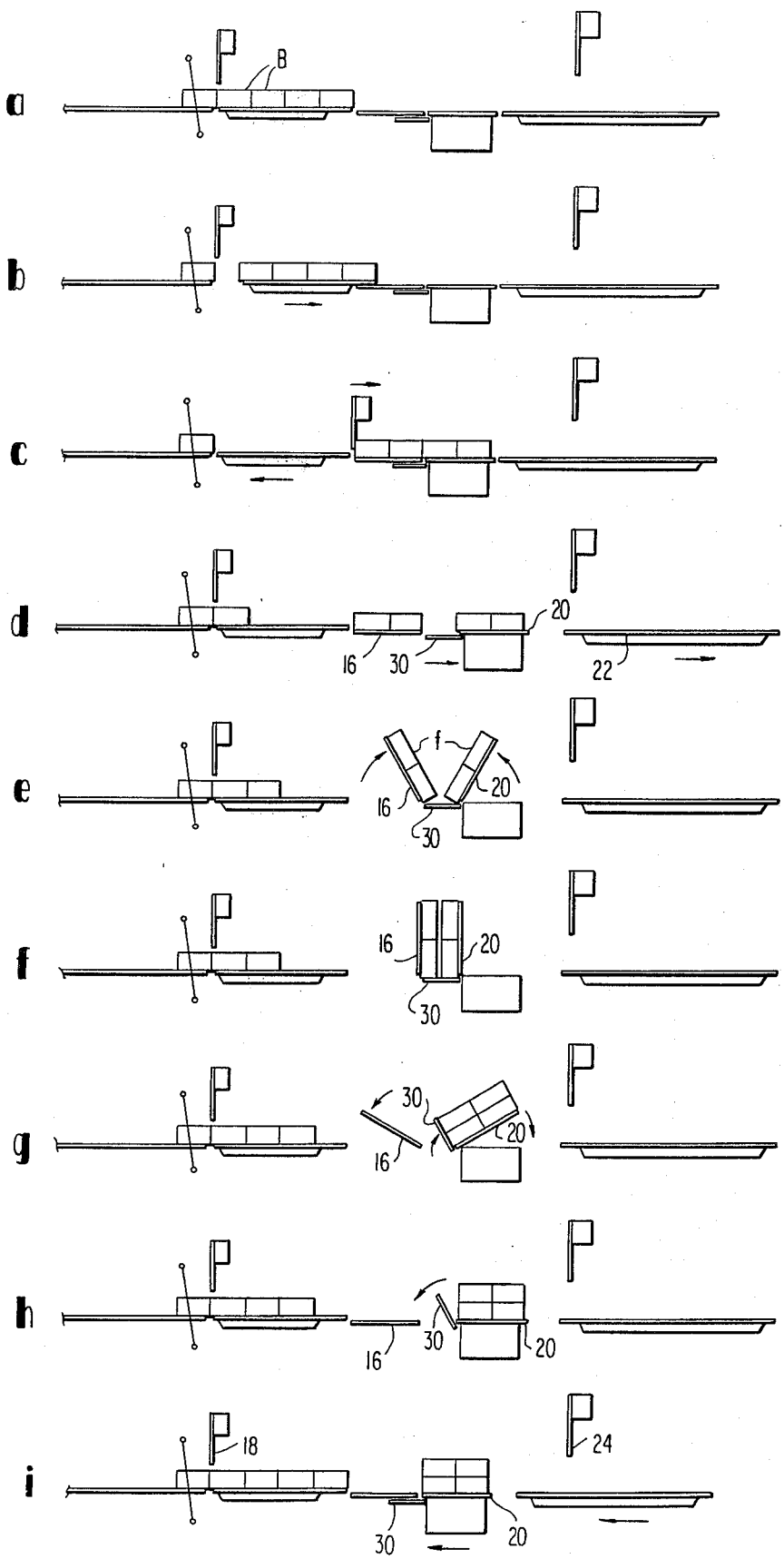

METHOD AND APPARATUS FOR HANDLING BRICKS

BACKGROUND OF INVENTION

In the art of making and handling bricks prior to the step where they are loaded onto a kiln car for transport to a kiln where they are fired and dried, it is often desirable to stack the bricks in two or more layers to make the handling of the bricks more efficient. At times, it is also desirable that the "faces", which are the smooth sides of the bricks, in upper and lower layers be contacting each other to avoid damage to the faces.

With methods and apparatus of the prior art, stacking of bricks has been accomplished by opposed gripping members which grip the bricks in one group, raise the gripped bricks and then deposit them on another group of bricks. In situations where facing as well as stacking is desired, brick gripper members after gripping the bricks are rotated or pivoted 180° to orient the faces of the bricks prior to stacking them on the other group of bricks. In some devices of the prior art, the gripper members include inflatable tubes or bags or similar structure for gripping the bricks while, in other devices of the prior art, the gripper members are rigid pieces.

U.S. Pat. No. 3,161,431, to Francis issued Dec. 15, 1964, discloses a brick gripping device including inflatable gripper members for stacking or stacking and facing bricks. A similar device is disclosed in U.S. Pat. No. 3,480,161, to Bason issued Nov. 25, 1969, as well as U.S. Pat. No. 3,589,495, to Pearne et al issued June 29, 1971 (see FIG. 14). U.S. Pat. No. 3,338,815, to Lingl issued June 16, 1978, discloses a brick gripping device utilizing rigid bars. The above cited U.S. Pat. No. 3,589,495 to Pearne in FIG. 2, discloses an inverter device for inverting slugs (as opposed to bricks) utilizing a plate and vacuum produced at the surface of the plate for holding the slugs. In all of the patented devices just described, the bricks, or the slugs, are rotated 180° in order to perform the facing operation.

OBJECTS OF THE PRESENT INVENTION

It is an object of the present invention to provide novel method and apparatus for stacking bricks or stacking as well as facing bricks, in an efficient and dependable manner without utilizing inflatable or rigid brick gripping members or vacuum plates and without requiring that the bricks be rotated 180° in order to place them into facing relationship with underlying bricks.

A further object of the present invention is to provide such method and apparatus which utilizes movable fold plates for stacking or stacking and facing the bricks. Included herein is a provision of movable fold plates for holding first and second sets of bricks and for stacking them one on top of the other with or without facing the bricks.

Another object of the present invention is to provide such method and apparatus which may be incorporated into new or existing commercial brick making and handling systems.

SUMMARY OF INVENTION

Summarizing the present invention in its preferred form and as applied to bricks just after they have been formed from slugs such as by pushing the slugs through a wire cutter; the bricks are conveyed in end-to-end relationship onto first and second fold plates which are situated adjacent each other in the same horizontal plane with the second fold plate being positioned in advance of the first fold plate along the path of conveyance of the bricks towards a setting station where the bricks are set on kiln cars. When it is desired to stack the bricks without facing them, the second fold plate is then lowered relative to the first fold plate and then moved below the first fold plate such that the bricks on the fold plates are aligned one above the other. The second fold plate is then advanced in the direction of but below the conveyor path and simultaneously the bricks on the first fold plate are conveyed off the first plate and onto the bricks on the second plate. The second fold plate is then elevated back to the conveyor path then returned adjacent the first fold plate to close the gap therebetween whereupon the next incoming groups of bricks will convey the stacked bricks from the second fold plate along the conveyor path towards the setting station where the bricks will be taken by a setter head and placed into a kiln car for transport to a kiln.

Instead of merely stacking the bricks without facing them, when it is desired to stack as well as face the bricks to place the faces of the upper and lower layers of bricks into contacting interrelationship; after the bricks are conveyed onto the fold plates, the second fold plate is separated from the first fold plate to expose an underlying third fold plate which, in the preferred embodiment, is pivotally connected to the second plate adjacent its rearwardly positioned or trailing edge so as to underlie the first fold plate when the first and second fold plates are positioned adjacent each other. The first and second fold plates having been separated from each other to expose the third fold plate therebetween, the first and second fold plates are then pivoted or folded approximately 90° out of their horizontal position and towards each other so as to deposit the first and second groups of bricks onto the third fold plate with the faces of the groups of bricks in opposing interrelationship. The second and third plates are locked relative to each other at an angle of approximately 90° against relative movement and then the second and third plates are pivoted as a unit back down towards the conveyor path approximately 90° where the bricks thus become oriented into stacked and faced interrelationship. During the latter step, the first fold plate is also pivoted back approximately 90° to its original position along the conveyor path. The second fold plate is then moved towards the fold plate to close the gap therebetween to form a continuous path of conveyance after which the newly arriving groups of bricks arriving onto the first fold plate and eventually the second fold plate will move the stacked and faced bricks along the conveyor path towards the setting station.

Although in its preferred form, the present invention is applicable to green or raw bricks after they have been formed from slugs, it is conceivable that the present invention may also be applied to fired bricks or even slugs, that is, before the slugs are cut into green bricks. Other objects and features of the present invention are described below. Also, a summary of the method aspects of the invention may be gained from the method claims appearing below.

DRAWINGS

Other objects and features of the present invention will become apparent from the following detailed description taken in conjunction with the attached drawings in which:

FIG. 1 is a side elevational view of apparatus embodying the present invention for stacking or stacking and facing bricks;

FIG. 2 is an end view taken generally along lines 2—2 of FIG. 1;

FIG. 3 is a plan view of the apparatus of FIG. 1;

FIG. 4 is an elevational view of a portion of the apparatus appearing in FIG. 1 but shown in a different position;

FIG. 5 is an end view taken generally along lines 5—5 of FIG. 4;

FIGS. 7a through 7i are sequential, schematic views illustrating a brick stacking and facing operation formed in accordance with the method and apparatus of the present invention.

DETAILED DESCRIPTION

Figure 6:
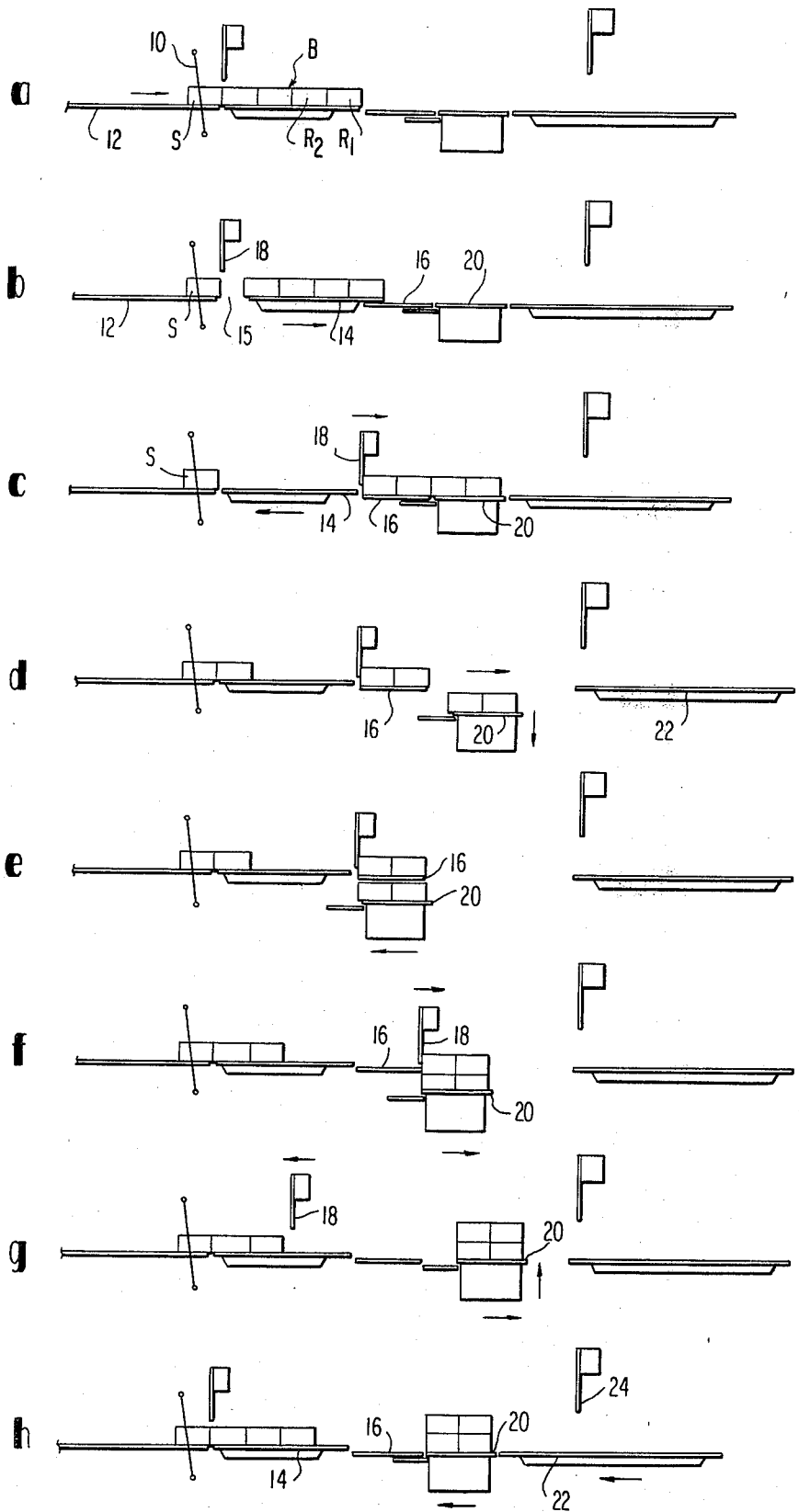
FIGS. 6a through 6h are sequential, schematic views illustrating a brick stacking operation formed in accordance with the method and apparatus of the present invention.

Reference is now made to the attached drawings which show for illustrative purposes only, methods and apparatus in accordance with the present invention utilized for stacking or stacking as well as facing, bricks. The methods of the present invention may be understood by reference to FIGS. 6 and 7 which respectively illustrate sequential steps in stacking bricks (FIG. 6), and stacking as well as facing bricks (FIG. 7). The term "facing" is well-known in the brick industry as meaning placing the smooth sides of the bricks in contact with each other. This facing is typically accomplished as part of a stacking operation.

STACKING

Referring first to FIG. 6 which illustrates a stacking operation in accordance with the present invention, bricks B are shown on a horizontal path of conveyance, a portion of which is formed by a horizontally movable carriage 14 movable along the conveyor path. Bricks B have just been formed from a slug S which has been pushed from an off-bearing belt 12 through cutting wires 10 and onto the carriage 14 which, of course, has a top support plate for supporting the bricks. In the typical commercial installation, the off-bearing belt 12 moves along a path of conveyance which is at right angles to the path of conveyance of the bricks as they are formed through the cutting wires and subsequently handled, the latter path of conveyance being illustrated by the arrow in FIG. 6a. After the bricks are formed, they are sequentially received on carriage 14 as illustrated in FIG. 6a. Bricks which are cut from a single slug S are oriented in a row so that when the bricks arrive on carriage 14 they arrive in rows R1, R2, etc., with the rows extending transversely to the direction of conveyance and with the adjacent ends of the bricks in each of the rows engaging each other. The number of bricks in each row may vary as desired, however, typical numbers are 9, 11, and 13 bricks, the latter being illustrated in FIG. 3 which will be discussed subsequently. It should also be understood that the bricks are initially conveyed onto the carriage 14 by the action of pushing a slug S through the cutting wires 10 by means of a pusher member (not shown), the latter being a conventional practice.

Referring to FIG. 6b, after as least two rows of bricks have been deposited onto the carriage 14 (FIG. 6b showing four rows), carriage 14 is moved along the path of conveyance as indicated by the arrow so as to form a gap 15 between carriage 14 and the off-bearing belt 12 to enable an overhead pusher member 18 to descent between the gap for conveying the bricks from carriage 14 along the path onto a pair of support plates 16 and 20 which may also be termed fold plates for reasons to become evident below. Moving along the path as just described, carriage 14 overlaps support plate 16 a certain degree as shown in FIG. 6b.

Referring to FIG. 6c, pusher 18 then is moved above the path of conveyance to push the bricks onto support plates 16 and 20 after which carriage 14 is moved in the opposite direction along the path back towards the off-bearing belt 12 to receive the next incoming bricks cut from the subsequent slugs S.

Referring to FIGS. 6d and e, support plate 20 is moved downwardly below the conveyor path then rearwardly under the conveyor path until positioned below support plate 16 so that the bricks on support plate 16 directly overlie the bricks on support plate 20. During the latter steps, new rows of bricks continue to be formed by sequentially pushing slugs through cutting wire 10 and onto the carriage 14 as illustrated in FIGS. 6c, d and e.

Referring now to FIG. 6f, pusher 18 is activated to push the bricks on support plate 16 generally along the path of conveyance to remove them from support plate 16 while, at the same time, the underlying support plate 20 is moved in the same direction and in the proper timed sequence so that the bricks that were once on plate 16 become stacked on the bricks which continue to be supported by plate 20. Although not shown, another way of stacking the bricks is to withdraw plate 16 from under the bricks to deposit the latter on the underlying bricks on plate 20.

After the bricks have been stacked on plate 20, the latter is then elevated to restore it to the horizontal path of conveyance as illustrated in FIG. 6g. Subsequently, newly arriving bricks will push the stacked bricks from support plate 20 onto a carriage 22 from which they will be further conveyed along the path by an overhead pusher 24 to a setting station (not shown) where they will be set onto kiln cars (not shown).

STACKING AND FACING

Instead of merely stacking the bricks as was described above, if it is desired to stack the bricks with their faces f (their smooth sides) contacting each other, the bricks are handled in the manner illustrated in FIGS. 7a through i. Before describing the stacking and facing method of the present invention, it should be understood that as the bricks are formed from the slugs S and deposited on carriage 14 all of their faces f (smooth sides) are oriented upwardly, see f in FIG. 7e. FIGS. 7a through d illustrate essentially the same steps as those of FIGS. 6a through d with the exception that when the bricks are positioned on support plates 16 and 20 and the latter plates are separated as shown in FIG. 7d, support plate 20 is not lowered as is the case in FIG. 6d. Instead, support plates 16 and 20 are pivoted or folded upwardly out of the path of conveyance towards each other as illustrated in FIG. 7e to place the faces f of the bricks into opposing relationship with each other. Because plates 16 and 20 are foldable in this manner, they may also be termed "fold plates" as was indicated above.

During the latter step, the bricks are bottomed on a third support plate 30 (or fold plate) positioned between support plates 16, 20. During this step, the rows of bricks on plates 16 and 20, respectively, pivot about the lowermost portions of the lowermost rows of bricks. In the specific embodiment shown, support plates 16 and 20 are pivoted approximately ninety degrees (90°) from the positions shown in FIG. 7d to the positions shown in FIG. 7f so that in the latter positions, the faces of the bricks are opposed and the bricks are supported on their ends on plate 30 and constrained on their sides by plates 16 and 20 which extend in vertical planes.

Returning to the step illustrated in FIG. 7d, before the plates 16 and 20 are folded, support plate 20 is first moved to the right relative to support plate 16 for the purpose of allowing support plate 30 to be interpositioned between support plates 16 and 20 in order to support the bricks during the facing operation. In order to accommodate this separation of plates 16 and 20 which in the preferred embodiment takes place by moving support plate 20 to the right as viewed in FIG. 7d, the carriage 22 which constitutes a part of the conveyor path downstream of the support plates, is moved to the right as illustrated by the arrow under carriage 22 in FIG. 7d.

Continuing now with the sequence, referring to FIG. 7g, after the bricks have been faced, support plates 20 and 30 are fixed at right angles relative to each other against any relative movement and then these plates, with the faced bricks supported thereon, are pivoted in a clockwise direction as shown by the arrow in FIG. 7g to place the bricks in stacked and faced relationship on the horizontal path of conveyance. During the latter step, support plate 16 is pivoted in a counterclockwise direction to restore it to its original position on the horizontal conveyor path.

Referring now to FIG. 7h, after the bricks have been stacked and faced, support plate 30 is pivoted downwardly counterclockwise below the path of conveyance and the planes of plates 16 and 20 and then plates 16 and 20 are moved closer together to close the gap therebetween which in the shown embodiment is effected by moving plate 20 to the left as shown in FIG. 7i. Carriage 22 is also moved to the left as shown in FIG. 7i to permit it to receive the stacked and faced bricks when the next arriving bricks being moved by pusher 18 push the stacked and faced bricks off plate 20, the latter step not being shown in the drawings.

APPARATUS

While portions of apparatus embodying the invention have been described above in connection with the methods of the present invention, FIGS. 1 through 5 illustrate in more detail apparatus embodying the invention for carrying out the methods described above. Referring initially to FIG. 1 which shows the apparatus in the position generally corresponding to that in FIG. 7d, there is shown the carriage 14 for receiving bricks from the off-bearing belt 12 after the bricks have been cut from slugs. Carriage 14 has an underlying frame including depending rollers 40 received in tracks formed on opposite sides of the path by rails 42 which are fixed to and supported by frame columns 44, the latter being founded on a base frame 46. Actuation of carriage 14 along the horizontal conveyor path is by means of any suitable motor such as a fluid motor 48 which is anchored at one end at 50 to rails 42. Motor 48 has an extendable and retractable rod 52 suitably connected to the frame of carriage 14 to move the carriage along the conveyor path in either direction.

Pusher 18 in the preferred embodiment shown, is located above the conveyor path in a vertical plane extending transversely across the conveyor path. Pusher 18 is provided with rollers 55 on its opposite sides movable in a vertical frame 56 under the influence of a fluid motor 58 mounted above and to frame 56. In this way, pusher 18 may be lowered or raised relative to the underlying main conveyor path. In addition to the above movement, pusher 18 may also be moved in a horizontal plane above the conveyor path through means of a main pusher frame 61 to which vertical frame 56 is fixed. Main frame 61 is provided with rollers 62 movable along rails 60, the latter being supported on frame columns 44. Actuation of main frame 61 along rails 60 is effected by a fluid motor 64 operatively connected to main frame 61 to move it along rails 60 in either direction. Pusher 18 is not used only to convey bricks from carriage 14 onto support plates 16 and 20 but also to push bricks off plate 16 onto bricks supported on plate 20 as illustrated in FIG. 6b and described above.

Referring now to FIGS. 1 and 3, fold plate 16 is pivoted at 62 which is a pivot rod whose ends are suitably mounted on rails 42 on opposite sides of fold plate 16. Pivoting of fold plate 16 about its pivot axis 62 is achieved in the preferred embodiment shown, by means of a pair of vertically oriented fluid motors 64 suitably fixed to rails 42 on opposite sides of and below fold plate 16. Fluid motors 64 have actuating rods 66 pivotally connected to lugs fixed to the underside of fold plate 16 on opposite sides thereof.

Fold plate 20 is pivotally mounted at its trailing or rearwardly positioned edge, by means of pivot rod 70 mounted to side frames 72 below opposite sides of fold plate 20. Side frames 72 have depending frame legs 81 mounted for vertical movement in vertical frame members 80 by means of rollers 82 mounted to legs 81. Fold plate 20 is lowered or elevated relative to the main conveyor path by means of a suitable motor such as the fluid motor 84 having an actuating rod 85 connected to a cross frame member 86 which is fixed to legs 81. Referring to FIG. 1, actuation of motor 84 to retract its actuating rod 85, will lower frame legs 81 and consequently the fold plate 20; a lowered position of fold plate 20 being illustrated in FIG. 4 which will be described subsequently.

For the purpose of moving fold plate 20 beneath fold plate 16 after fold plate 20 is lowered in the manner just described, frames 80 in which legs 81 of fold plate 20 are mounted, are fixed to a horizontal frame 90 which is provided with suitable rollers 92 movable along rails 94 which extend in a horizontal plane below the main conveyor path; rails 94 being fixed to columns 44 for support. Frame 90 is actuated along rails 94 by means of a suitable motor such as the fluid motor 95 fixed at 97 relative to rail 94 and having an actuating rod 96 suitably connected to frame 90 as best shown in FIG. 1. In order to move fold plate 20 beneath fold plate 16 after fold plate 20 has been lowered, motor 95 is actuated to retract rod 96 and thereby move frame 90 along rails 94 into the position shown in FIG. 4. Of course, extension of rod 96 from the position shown in FIG. 4 will restore frame 90 to the position shown in FIG. 1 whereupon fold plate 20 may be elevated to the position in the main conveyor path as shown in FIG. 1.

In the preferred embodiment illustrated, fold plate 30 is pivotally mounted about the same pivot shaft 70 associated with fold plate 20. Therefore, when in the horizontal position shown in FIG. 1, fold plate 30 is offset below the plane of fold plate 20 so that fold plates 20 and 16 may be brought together with fold plate 30 located below the same as best illustrated in FIG. 7i. In the position of FIG. 1, fold plates 16 and 20 are shown separated from each other to expose fold plate 30, such position corresponding to that shown in FIG. 7d, for example.

Referring to FIG. 1, fold plate 30 is actuated about pivot 70 by means of a fluid motor 78 suitably fixed to support rails 72 by means of a cross frame member. Fluid motor 78 is positioned below a mid point of support plate 30 and has an actuating rod connected at 79 to the underside of fold plate 30. Extension of the actuating rod of fluid motor 78 will cause fold plate 30 to pivot upwardly as illustrated and described above in connection with FIG. 7g. During this latter motion of fold plate 30 which is utilized to restore the faced bricks onto the conveyor path in stacked condition, fold plate 30 is locked against movement relative to fold plate 20 in any suitable manner such as by maintaining the actuating rod of the motor 78 in the fixed extended position. Any other suitable means may be provided such as releasable latch mechanisms (not shown) on the opposite sides of fold plates 20 and 30 to hold plates 20 and 30 fixed to each other at right angles during stacking of the faced bricks.

As indicated above, carriage 22 located downstream of fold plate 20 is mounted for movement along the main conveyor path in either direction. This is achieved by rollers 100 depending from an underlying frame portion of carriage 22 and movable along rails 42a as shown in FIGS. 1 and 3. Rails 42a extend on opposite sides of and below carriage 22 where they are fixed to and supported by columns 44. Actuation of carriage 22 along rails 42a towards and away from fold plate 20 is achieved by a fluid motor 100 suitably anchored at 104 with respect to rails 42a. Motor 102 has an extendable and retractable actuating rod 105 connected at 106 to the underside of carriage 22 to move carriage 22 towards fold plate 20 when the rod 105 is extended and to move carriage 22 away from fold plate 20 when rod 105 is retracted.

Referring now to FIGS. 1 and 2, overhead pusher 24 is employed to move the stacked bricks along carriage 22 to a further position along the main conveyor path towards the setting station where the stacked bricks are set on kiln cars (not shown). Pusher plate 24 extends above and across carriage 22 and has a plurality of rollers 110 movable along a vertical frame 112 under actuation by a fluid motor 114. The latter has an actuating rod 115 connected to pusher 24 so that upon extension of actuating rod 115, pusher plate 24 will be lowered towards the main conveyor path and upon retraction of actuating rod 115, pusher plate 24 will be raised away from the conveyor path. In order to convey stacked bricks along carriage 22 after pusher plate 24 has been lowered, the vertical frame 112 of the pusher is fixed to a horizontal frame 116 which, in turn, is provided with rollers receivable in rails 120 on opposite sides of the pusher where they are supported by columns 44. Actuation of frame 116 is achieved by a fluid motor 122 having an actuating rod 124 fixed to frame 116 to move it along rails 120 depending on the direction of actuation of motor 122. Motor 122 is suitably fixed relative to rails 120 at the right end thereof as best shown in FIG. 1.

The entire operation of the various parts in performing the stacking or stacking and facing functions may be controlled automatically or semiautomatically by means of conventional limit switches and control valves supplying and exhausting the various fluid motors.

Although the term "plate" has been used to describe the fold plates 16, 20 and 30, the invention including the appended claims is not to be limited to any specific sort of plate but rather, any member whether formed from metal, wood or other suitable material, may be employed as long as it provides a surface for supporting bricks. In addition, apparatus other than that shown and described may be employed to carry out the methods of the present invention.

What is claimed is:

1. A method of facing and stacking rows of bricks to bring at least two rows of bricks into stacked interrelationship with the faces of the bricks in one row contacting the faces of the bricks in the other row comprising the steps of: individually pivoting the rows of bricks respectively from a generally horizontal plane towards each other into generally vertical planes until their faces are opposing each other and then pivoting the rows of bricks as a unit into horizontal planes to place them into stacked interrelationship with their faces contacting each other, and wherein the bricks are initially positioned on first and second fold plates, respectively and the bricks are individually pivoted by means of the fold plates, and wherein initially the bricks are conveyed in end-to-end relationship and they are individually pivoted about their adjacent ends, and wherein initially the adjacent ends of the bricks are separated from each other by moving the fold plates away from each other prior to individually pivoting the bricks.

2. The method defined in claim 1 wherein during the first defined step the bricks are each pivoted approximately 90° and wherein during the second defined step, the bricks are pivoted as a unit approximately 90°.

3. The method defined in claim 1 wherein after the bricks are separated and while they are individually pivoted, the bricks are supported from below.

4. The method defined in claim 3 wherein the bricks are individually pivoted approximately 90° to bring their faces into opposing interrelationship, and wherein the bricks are pivoted approximately 90° as a unit to bring them into stacked and facing interrelationship.

5. The method defined in claim 1 wherein during individual pivoting of the bricks, the bricks are supported by a third fold plate positioned between the first and second fold plates.

6. The method defined in claim 5 wherein during pivoting of the bricks as a unit into their stacked and facing interrelationship, the bricks are supported by the second and third fold plates.

7. The method defined in claim 6 wherein prior to pivoting the first and second fold plates to individually pivot the bricks, the first and second fold plates are separated from each other to form a gap to allow the positioning of the third fold plate between the first and second fold plates.

8. The method defined in claim 7 wherein the second and third fold plates are pivotally interconnected and wherein during individual pivoting of the bricks, the second fold plate is pivoted relative to the third fold plate, and during pivoting of the bricks as a unit into their stacked and faced interrelationship the second and third fold plates are moved together as a unit.

9. A method of facing and stacking bricks to bring at least two bricks into stacked interrelationship with their faces contacting each other comprising the steps of: conveying first and second sets of bricks in end-to-end relationship along a horizontal path with their faces constituting the upper surfaces of the bricks onto first and second horizontally positioned fold plates, moving the fold plates away from each other in generally horizontal planes to separate the adjacent ends of the first and second sets of bricks and to expose a third support plate positioned between said first and second fold plates, pivoting said first and second fold plates towards each other about generally horizontal axes to pivot the first and second sets of bricks about their adjacent ends and to bring the faces of each set of bricks into opposing relationship and with the bricks being supported on the third plate, pivoting the second fold plate and the third plate together about a horizontal axis to return the bricks in stacked and faced relationship into horizontal planes, and pivoting the first fold plate away from the bricks back into a horizontal plane.

10. A mechanism for use along a horizontal path of conveyance for stacking bricks on the path, the mechanism comprising in combination, first and second support plates pivotable from a first position wherein they are in generally side-by-side relationship in generally the same horizontal planes, to a second generally vertical position for pivoting bricks thereon approximately 90°, said support plates having planar surfaces for constraining and supporting bricks while pivoting, means for independently pivoting said plates between said positions thereof, and support means including said plates for supporting said bricks while they are being pivoted between said positions, said support means including a third plate pivotable as a unit together with said second plate for placing the bricks in a stacked position relative to each other, said first plate being pivotable away from said second plate from the vertical position to the horizontal plane while the second and third plates are being pivoted as a unit to stack the bricks, and wherein there is further included means for moving said second plate below said first plates.

11. A method of handling and stacking bricks during a stage in their conveyance along a generally horizontal path comprising the steps of sequentially conveying a plurality of sets of bricks along the path, lowering a first set of bricks below the path, stacking a second set of bricks on the first set of bricks, elevating the stacked first and second sets of bricks to the path and conveying the stacked sets further along the path, and wherein the said first set of bricks are initially positioned in advance of said second set of bricks when on the path and wherein said first set of bricks is lowered from the path and moved rearwardly of the path under said second set of bricks.

12. The method defined in claim 11 wherein after the sets of bricks are stacked they are moved forwardly under and upwardly to the path.

13. A method of handling and stacking bricks during a stage in their conveyance along a generally horizontal path comprising the steps of sequentially conveying a plurality of sets of bricks along the path, lowering a first set of bricks below the path, stacking a second set of bricks on the first set of bricks, elevating the stacked first and second sets of bricks to the path and conveying the stacked sets further along the path, and wherein the method further includes the steps of utilizing two support plates with the first set of bricks received on one support plate and the second set of bricks received on the other support plate, and wherein said one support plate is moved under the other support plate and then the bricks on the other support plate are removed from the other support plate and stacked on the bricks on said one support plate which is then elevated to the conveyor path with the bricks stacked thereon, and wherein the bricks on said other support plate are moved off said other support plate in one direction simultaneously with movement of said one support plate in the same direction such that the first set of bricks are thereby stacked on the second set of bricks.

14. A method of handling and stacking bricks during a stage in their conveyance along a generally horizontal path comprising the steps of sequentially conveying a plurality of sets of bricks along the path, lowering a first set of bricks below the path, stacking a second set of bricks on the first set of bricks, elevating the stacked first and second set of bricks to the path and conveying the stacked sets further along the path, and wherein the method further includes the steps of utilizing two support plates with the first set of bricks received on one support plate and the second set of bricks received on the other support plate, and wherein said one support plate is moved under the other support plate and then the bricks on the other support plate are removed from the other support plate and stacked on the bricks on said one support plate which is then elevated to the conveyor path with the bricks stacked thereon, and wherein after said one support plate with the bricks stacked thereon is elevated to the conveyor path, said support plates are moved adjacent each other, and wherein additional bricks are conveyed along the path pushing the stacked bricks from said one support plate further along the path.

15. Apparatus for handling and stacking bricks comprising in combination; a generally horizontal path for conveying bricks, first and second support plates sequentially positioned adjacent each other along the path, means for conveying in sequence a plurality of bricks along said path and onto said support plates, and means for lowering one of the support plates with bricks thereon below the path of conveyance to enable bricks on the other support plate to be stacked on the bricks on said one support plate, and for subsequently raising said one support plate back to the conveyor path for permitting the stack of bricks to be conveyed further along the path, and wherein the apparatus further includes means for moving said one support plate in a horizontal plane below the other support plate, and means for stacking the bricks from said other support plate onto the bricks on said one support plate.

16. Apparatus defined in claim 15 wherein said last defined means for stacking the bricks includes means for conveying bricks from said other support plate along the conveyor path and onto the bricks on said one support plate when positioned below said conveyor path.

17. Apparatus defined in claim 16 wherein said one support plate when positioned on said conveyor path is positioned in advance of said other support plate relative to the direction of bricks and conveyed along the path.

18. Apparatus defined in claim 15 including means for pivoting said support plates upwardly from the conveyor path for moving other bricks supported thereon into vertical planes with their faces opposing each other and then for stacking the bricks on the conveyor path and wherein there is further included support means positioned between said first and second support plates for supporting bricks when they are moved into vertical planes by said first and second support plates and when they are subsequently stacked on the conveyor path.

19. Apparatus defined in claim 18 wherein there is further included means for separating said first and second support plates along the path of conveyance for exposing said support means.

20. Apparatus defined in claim 19 wherein there is further provided means for moving said support means together with one of said support plates for stacking the bricks on the conveyor path.

21. The apparatus defined in claim 20 wherein said third support means includes a third plate pivotally connected relative to said one support plate at a trailing end portion thereof.

22. Apparatus defined in claim 18 further including a carriage for receiving bricks and movable along said path of conveyance to positions before said first and second support plates, a first pusher for moving bricks from said carriage onto said first and second support plates, a second carriage movable along said path of conveyance at a location downstream of said first and second plates for receiving stacked bricks from one of said support plates, and a second pusher for moving stacked bricks along said second carriage along the path of conveyance.

23. A mechanism for use along a horizontal path of conveyance for stacking bricks on the path, the mechanism comprising in combination, first and second support plates pivotable from a first position wherein they are in generally side-by-side relationship in generally the same horizontal planes, to a second generally vertical position for pivoting bricks thereon approximately 90°, means for pivoting said plates between said positions thereof, and support means including said plates for supporting said bricks while they are being pivoted between said positions, and wherein said support means includes a third plate pivotable as a unit together with one of said first and second plates for placing the bricks in a stacked position relative to each other, and wherein there is further included means for moving said one plate below the other of said first and second plates, and wherein said first and second plates are movable in said horizontal planes towards and away from each other.

24. The mechanism defined in claim 23 wherein said third support plate is pivotally connected to said one plate.

25. The mechanism defined in claim 23 further including means for moving bricks off the other of said first and second plates and onto bricks located on said one plate when said one plate is located below said other plate.

26. The mechanism defined in claim 25 wherein said one plate is movable in a horizontal plane below said other plate.

27. The mechanism defined in claim 23 wherein said means for pivoting said plates includes first and second motors having extensible and retractable actuating rods connected to said plates respectively.

28. The mechanism defined in claim 23 wherein said means for pivoting said first and second plates includes motors having extensible and retractable actuating rods connected to said first and second plates respectively and wherein there is further included a motor having an extensible and retractable actuating rod connected to said third plate for holding the third plate in predetermined position relative to said one plate for placing the bricks in stacked position relative to each other.

29. A method of facing and stacking bricks to bring at least two bricks into stacked interrelationship with their faces contacting each other comprising the steps of: individually pivoting the bricks respectively from a generally horizontal plane towards each other until their faces are opposing each other and pivoting the bricks as a unit to place them into stacked interrelationship with their faces contacting each other, wherein the bricks are initially positioned on first and second fold plates respectively and wherein the bricks are individually pivoted by means of the fold plates, and wherein during individual pivoting of the bricks, the bricks are supported by a third fold plate positioned between the first and second fold plates, and wherein during pivoting of the bricks as a unit into their stacked and facing interrelationship, the bricks are supported by the second and third fold plates, and wherein prior to pivoting the first and second fold plates to individually pivot the bricks, the first and second fold plates are separated from each other to form a gap to allow the positioning of the third fold plate between the first and second fold plates, and wherein after the bricks have been stacked and faced, the gap between the first and second fold plates is closed and another group of bricks are delivered onto the first fold plate pushing the stacked and faced bricks off the second fold plate.

30. The method defined in claim 29 wherein the gap between the first and second fold plates is closed by moving one of the fold plates relative to the other.

* * * * *